US 6,644,735 B2

(12) United States Patent
Bargheer et al.

(10) Patent No.: US 6,644,735 B2
(45) Date of Patent: Nov. 11, 2003

(54) AUTOMOBILE SEAT

(75) Inventors: Claudio Bargheer, Suttgart (DE); Peter Nordberg, Graz (AT); Vasilios Orizaris, Renningen (DE); Karl Pfahler, Stuttgart (DE); Lothar Renner, Nufringen (DE)

(73) Assignee: DaimlerChrysler AG, Stuttgart (DE)

( * ) Notice: Subject to any disclaimer, the term of this patent is extended or adjusted under 35 U.S.C. 154(b) by 78 days.

(21) Appl. No.: 09/985,186

(22) Filed: Nov. 1, 2001

(65) Prior Publication Data

US 2002/0063451 A1 May 30, 2002

(30) Foreign Application Priority Data

Nov. 1, 2000 (DE) .......................................... 100 54 008

(51) Int. Cl.$^7$ .................................................. A47C 7/72
(52) U.S. Cl. ............................. 297/180.13; 297/452.47; 297/180.14
(58) Field of Search ....................... 297/180.12, 180.13, 297/180.14, 452.46, 452.47

(56) References Cited

U.S. PATENT DOCUMENTS

| | | | | |
|---|---|---|---|---|
| 5,102,189 A | * | 4/1992 | Saito et al. | 297/180.14 X |
| 5,927,817 A | * | 7/1999 | Ekman et al. | 297/452.47 |
| 6,059,018 A | * | 5/2000 | Yoshinori et al. | 297/180.14 X |
| 6,196,627 B1 | * | 3/2001 | Faust et al. | 297/180.14 |

FOREIGN PATENT DOCUMENTS

| DE | 19654370 C1 | 1/1998 |
|---|---|---|
| DE | 19824191 A1 | 12/1998 |
| DE | 19830797 A1 | 1/1999 |
| DE | 19910390 A1 | 9/1999 |
| DE | 19927232 A1 | 12/1999 |

* cited by examiner

Primary Examiner—Anthony D. Barfield
(74) Attorney, Agent, or Firm—Crowell & Moring LLP

(57) ABSTRACT

An automobile seat for a convertible motor vehicle has a seat back with an appropriate headrest. At least one air outflow opening of an air supply system is arranged in an upper area of the seat back in order to reduce undesirable drafts. At least one additional air outflow opening of the air supply system is provided in the seat surface facing the seat occupant for seat ventilation and/or seat heating purposes.

14 Claims, 5 Drawing Sheets

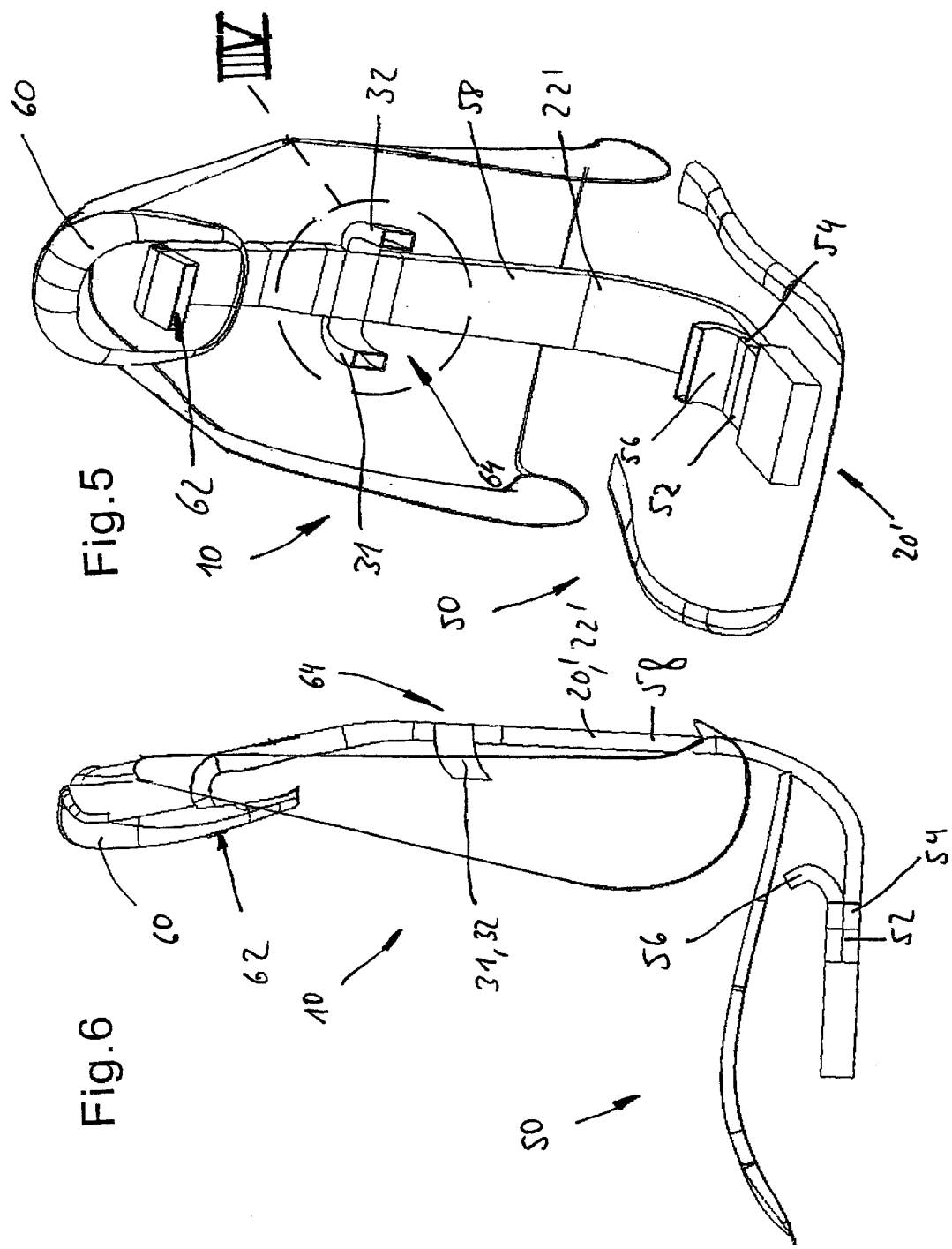

AUTOMOBILE SEAT

This application claims the priority of German application 100 54 008.2, filed Nov. 1, 2000, the disclosure of which is expressly incorporated by reference herein.

This application is also generally related to U.S. application Ser. No. 09/985,180 titled "MOTOR VEHICLE SEAT", filed on the same day as the present application.

BACKGROUND AND SUMMARY OF THE INVENTION

The present invention relates to an automobile seat for a convertible motor vehicle including a seat cushion, a seat back, and an appropriate headrest for the back of the seat. Such a seat has at least one air outflow opening of an air supply system arranged in an upper area of the back in order to reduce undesirable drafts.

An automobile seat for a convertible motor vehicle of this type is known from German publication DE 196 54 370 C1 and has a seat section and a back of the seat with an appropriate headrest. Air nozzles of an air supply system are arranged in the upper area of the back of the seat in order to reduce undesirable drafts by providing airflow around the head, shoulder and neck areas of a seat occupant.

One object of the invention is to create an automobile seat of the kind described above which has an air supply system that can be used universally.

One manner in which this object is achieved is by providing at least one additional air outflow opening of the air supply system in a seat surface facing a seat occupant for seat ventilation purposes, seat heating purposes, or both seat ventilation and seat heating purposes.

The air supply system of an automobile seat pursuant to the invention serves to not only reduce undesirable drafts but, beyond that, to provide seat ventilation and/or seat warming. In the surf ace of the back of the seat and/or of the seat cushion facing a seat occupant, at least one additional air outflow opening of the air supply system is provided. Accordingly, both a separate seat heater, such as a separate heating pad arranged beneath the seat cover, and a separate seat ventilation system, such as fans arranged beneath the seat cover, can be foregone.

Instead, according to the invention, an air distribution system is provided for all functions, either separately or jointly, with only one air supply system. By combining several functions assumed by the air supply system, both the design and the assembly complexity of the automobile seat can be simplified. Additionally, the effort required to control the described functions, combined here into the air supply system, can be reduced significantly.

The air supply system—with the exception of the air outflow openings—can be integrated in the seat, possibly together with the fan and the heating element, so that it is invisible to the occupant. When integrating the fan and the heating element within the seat, warm air can be made available particularly quickly at the various air feed openings.

At the same time, it is also feasible to supply the air supply system, possibly without a separate fan and/or heating element, with air from the heating or air conditioning system of the vehicle.

Further advantages, features and details of the invention will be clear from the following description of preferred embodiments as well as the drawings.

BRIEF DESCRIPTION OF THE DRAWINGS

FIGS. 5 and 6 are diagrammatic perspective front and side views of the back of an automobile seat and a seat cushion with an air supply system pursuant to another embodiment of the invention;

DETAILED DESCRIPTION OF THE INVENTION

Figure 1:
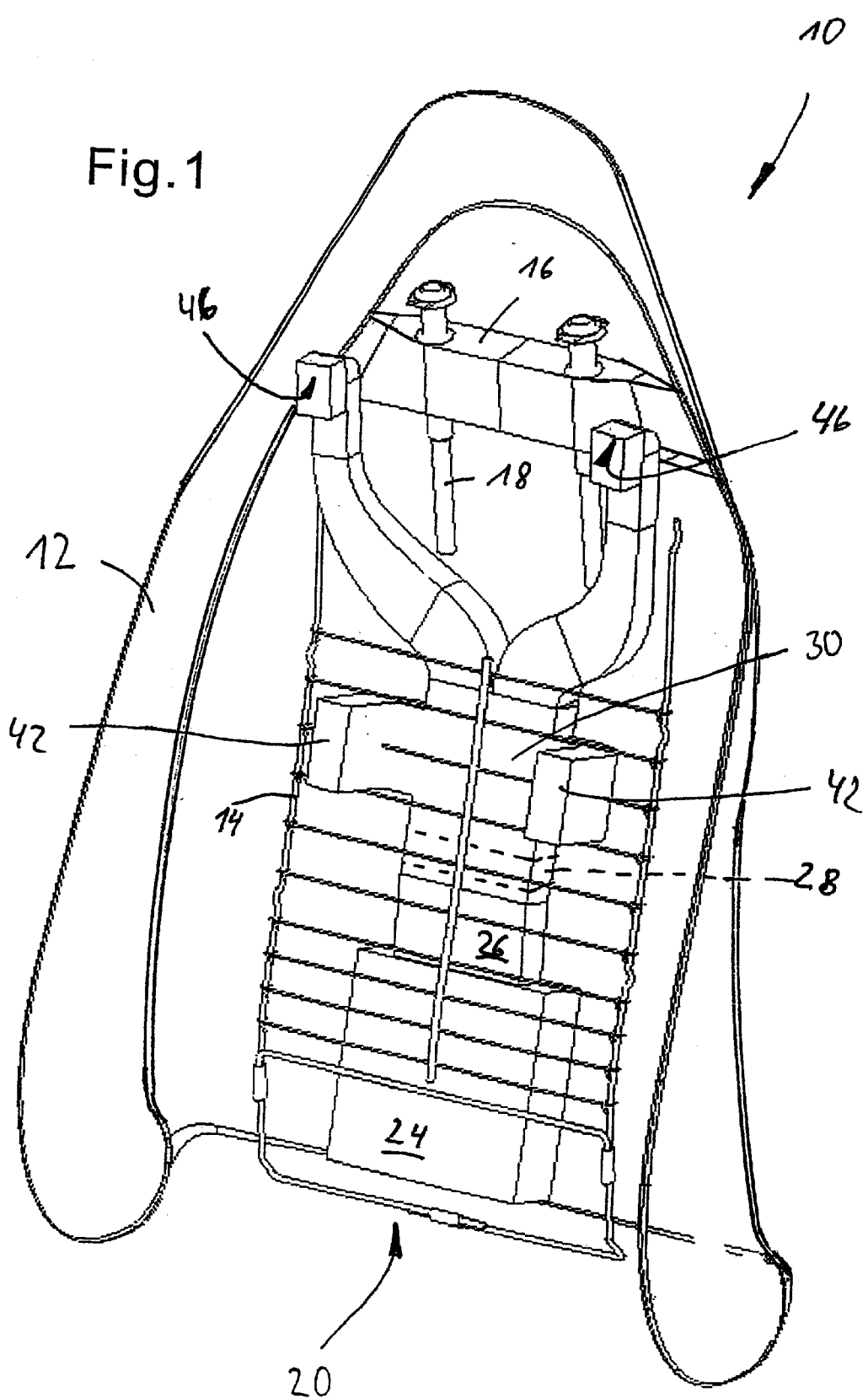
FIGS. 1–3 are a diagrammatic perspective front view, a diagrammatic perspective rear view, and a diagrammatic side view of a back of an automobile seat with an air supply system pursuant to a first embodiment of the invention.
Figure 2:
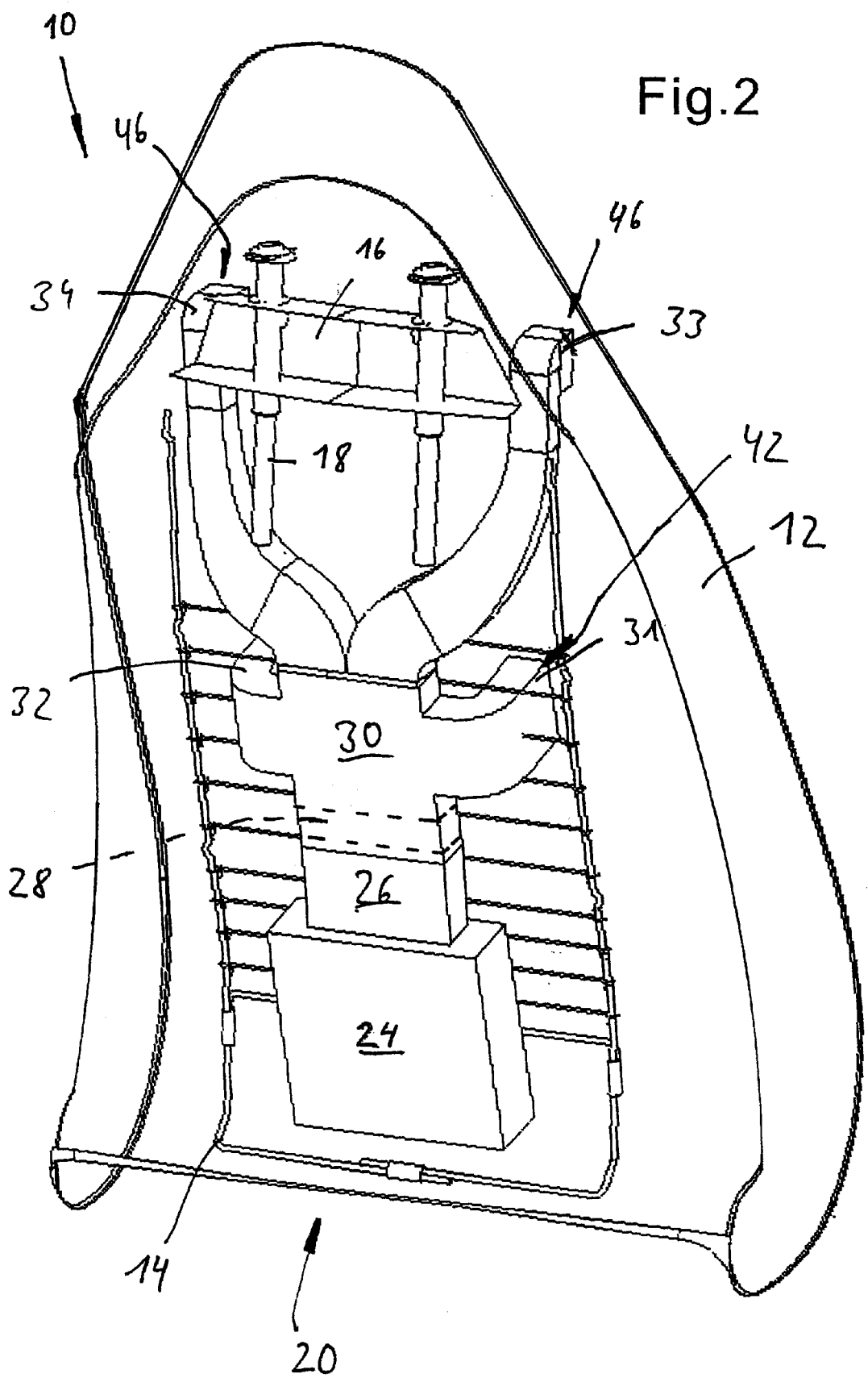
Figure 3:
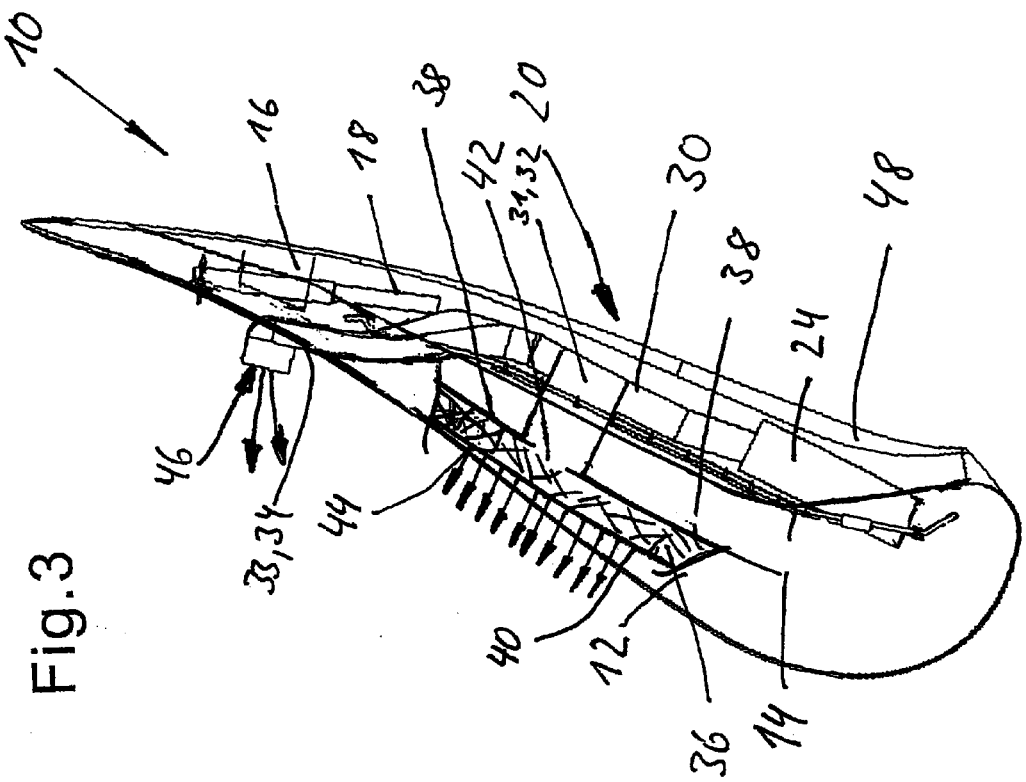

FIGS. 1 through 3, respectively, show diagrammatic perspective front, rear, and side views of the back 10 of an automobile seat for a convertible motor vehicle.

The back 10 of the seat depicted in FIGS. 1 through 3 has a frame 12, an elastic support device 14 of a seat cushion, and a guiding device 16, which is firmly connected with the frame 12. The guiding device is for guide rods 18 of a headrest, which has a height that can be adjusted and which is not shown. In the back 10 of the seat, an air supply system 20, which comprises a duct configuration 22, is integrated. A fan 24, held here in a housing, has air intake occurring, for example, on the bottom of the back 10 of the seat, and is arranged in front of the duct configuration 22. On the pressure side of the fan 24, the air current reaches a heating element 28. The heating element is indicated by a dotted line, can adjust the air current temperature at the request of the seat occupant, and can be connected via a duct section 26. The heating element 28 is followed by a distribution system 30, with which the air current can be distributed to a lower partial duct set 31, 32 and an upper partial duct set 33, 34, depending on the setting selected by the passenger. In order to adjust the partial air currents, shut-off devices and/or guiding devices, for example, are provided in the partial ducts 31–34, as will be explained in more detail with reference to FIG. 8. In this context, it is also feasible to arrange a separate heating element 28, or, additionally, a cooling element, in each partial duct 31–34. The lower partial duct set 31, 32 is arranged roughly half-way up the back 10 of the seat and is basically U-shaped when viewed from the top.

FIG. 3 shows that the two partial ducts 31, 32 flow into a spacer fabric 36 resting on the support device 14. The spacer fabric 36 is covered on its rear, facing the duct configuration 22, by an airlight layer 38 and on its front by a seat cover 40. Inflow openings 42 are provided in the rear-side layer 38, through which the partial air currents of the partial ducts 31, 32 can flow over into the spacer fabric 36. In the spacer fabric 36, the air flowing in through the partial ducts 31, 32 is distributed to several air outflow openings 44 in the perforated seat cover 40, which is made of leather, and/or in the seat surface. The air flowing out through the air outflow openings 44 in the seat surface facing the seat occupant then serves the purpose of seat ventilation and/or seat heating, depending on whether the seat has been warmed up or not.

Instead of the seat cover 40 made of perforated leather used in this example, a cloth cover is also feasible. In particular, for seat ventilation, the air is guided in the spacer fabric 36 preferably along the bottom of the seat cover 40 so that a direct outflow of the air against the back of the seat occupant can be avoided. Instead, air guided along the bottom of the seat cover 40 and exiting from the air outflow openings 44 should be directed in a tangential manner along the back of the seat occupant in order to absorb moisture from the back of the seat occupant and subsequently direct it away through the spacer fabric 36.

The upper partial duct set 33, 34 ends, in its height dimensions, in the area of the head, shoulder and neck area of the seat occupant and, with an open folding top of the automobile, serves to reduce the undesirable draft occurring with an open top. For this, a preferably warm air current, guided through the two partial ducts 33, 34 and heated by the heating element 28, is used. The warm air current is directed toward the head, shoulder and neck area of the seat occupant. It is also feasible, however, to use an air current which is not directed straight at the head, shoulder and neck area of the seat occupant, which would then particularly serve to compensate for air turbulence. This air current could possibly also be cold or not heated. In the embodiment shown here, the two air outflow openings 46 are arranged on the upper side edge of the back 10 of the seat.

The air supply system 20 works as follows.

In order to ventilate the seat surface facing the seat occupant, the heating element 28 is not activated and the distribution system 30 is switched so as to distribute the air current generated by the fan 24 to the multitude of air outflow openings 44 in the seat cover 40 only via the two lower partial ducts 31, 32. The two upper partial ducts 33, 34 are closed in this example by shut-off devices, not shown.

The seat heating system differs from the seat ventilation system only in that the heating element 28 is connected.

In order to reduce the undesirable drafts when driving with an open roof, the heating element 28 is preferably activated and the distribution system 30 switched in such a way that the air current generated by the fan 24 reaches the air outflow openings 46 and/or subsequently the head, shoulder and neck area of the seat occupant via the two upper partial ducts 33, 34.

When switching the shut-off devices appropriately, the three functions described, and in particular seat heating and draft reduction, can be coupled with each other.

Figure 4:
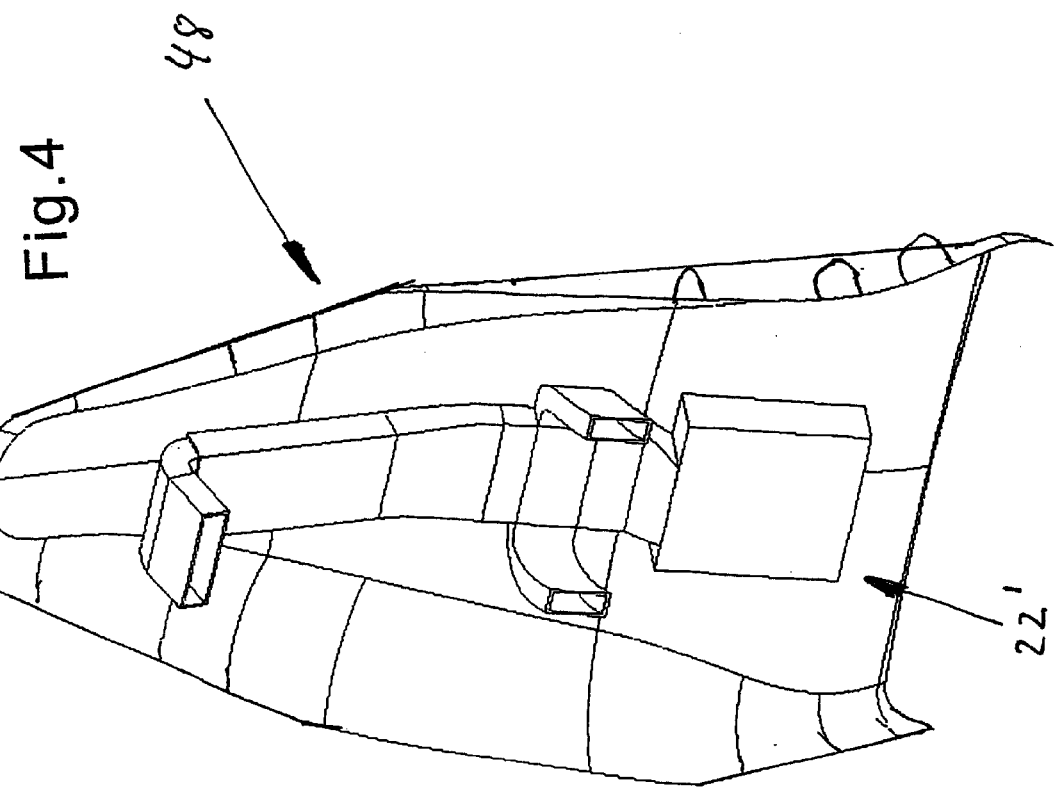
FIG. 4 is a diagrammatic perspective view of the rear back molding, combined into a sub-assembly component, and a duct configuration of the air supply system of the automobile seat.

FIG. 4 shows, in a perspective view, a rear back molding 48 and the duct configuration 22' arranged on it combined into a component sub-assembly. The depicted duct configuration 22' differs from that shown in FIGS. 1 through 3 only in that just one air outflow opening 46 is provided in the upper area of the back 10 of the seat, specifically in the headrest, in order to reduce draft. Upon mounting the duct configuration 22' on the back molding 48, it can be fastened to the back frame 12 in the way depicted in FIG. 4. At the same time, it is also feasible to fasten the duct configuration 22, 22' from the back of the back 10 of the seat on this section and subsequently arrange the back molding 48 on the frame 12.

FIGS. 5 and 6, respectively, show perspective front and side views of the back 10 of the seat and the seat cushion 50. The duct configuration 22' of the air supply system 20' runs both in the back 10 of the seat and in the seat cushion 50. Accordingly, in contrast to the two embodiments described in FIGS. 1 through 4, air outflow openings are also provided in the seat surface of the seat cushion 50 facing the seat occupant. On the pressure side of the fan 24, arranged here within the seat cushion 50, the air current is guided by a selectively connectable heating element 52. Depending on the setting selected by the passenger, the air current can be distributed via a distribution system 54 to a partial duct 56, in order to supply the air outflow openings of the seat cushion 50, and/or to a partial duct 58, in order to supply the air outflow openings 44 (FIG. 3) in the back 10 of the seat and to supply an air outflow opening 62 in the headrest 60 to reduce a draft. In order to adjust the partial air currents, shut-off devices are provided in the partial ducts 56, 58.

Figure 8:
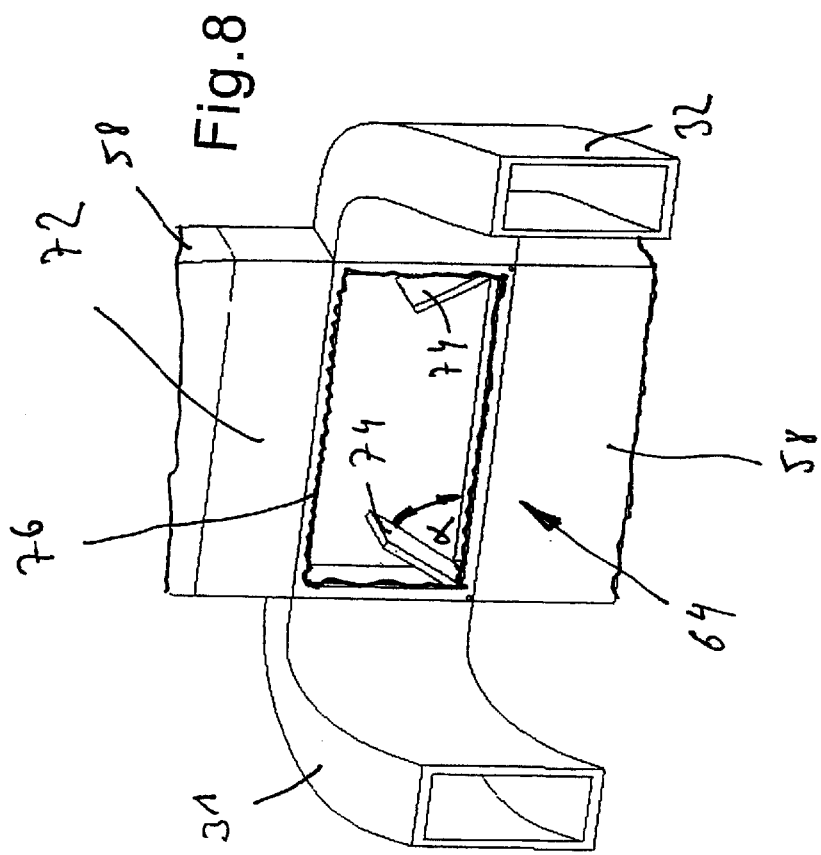
FIG. 8 is an enlarged illustration of the duct configuration detail in the area VIII of FIG. 5 and showing a distribution system for a first duct as well as for two additional ducts which branch away from and run crosswise with respect to the first duct.

Roughly half way up the back 10 of the seat, another distribution system 64, explained in more detail with reference to FIG. 8, is provided. With this distribution system, the air flowing through the partial duct 58 can be either branched off to the two partial ducts 31 and 32 in order to supply the air outflow openings in the back 10 of the seat or distributed further via the partial duct 58 in order to supply the air outflow opening 62 in the headrest 60. Supply of the air outflow openings 44 in the back 10 of the seat occurs via partial ducts 31, 32 and the connected spacer fabric 36 in the manner already described with reference to FIGS. 1 through 3. Supply of the air outflow openings, not shown here and provided in the seat cover of the seat cushion 50, takes place in a manner that is identical to that of the back 10 of the seat, i.e. with a spacer fabric that follows the partial duct 56, with the spacer fabric evenly distributing the inflowing air to the air outflow openings in the perforated seat cover of the seat cushion 50.

Figure 7:
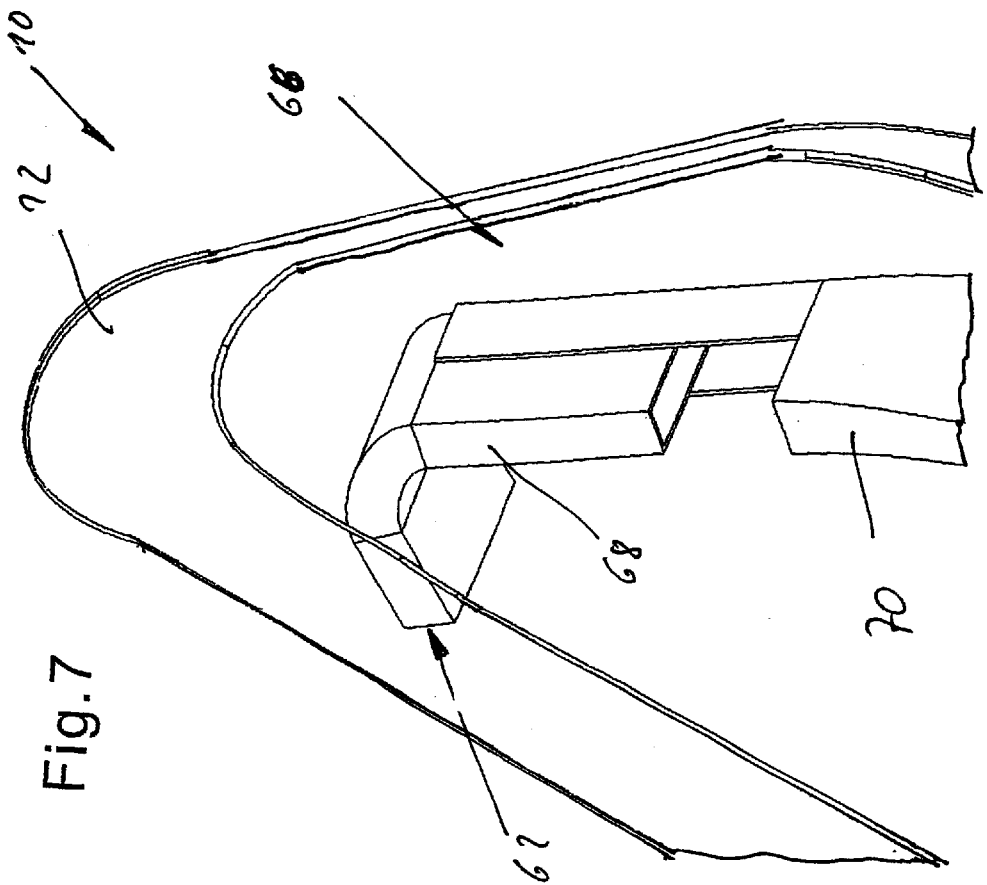
FIG. 7 is a diagrammatic perspective rear view of an upper area of the back of the seat shown in FIG. 5 and an air nozzle of the duct configuration which has movement coupled with height adjustment of the headrest.

The partial duct 58 ends, as shown in FIG. 6, with its air outflow opening 62 in a roughly flush integrated manner in the front of the headrest 60, such that the exiting air current is directed at the head and neck area of the seat occupant. It is clear from FIG. 6 and FIG. 7, which shows, in a perspective rear view, the upper area 66 of the back of the seat pursuant to FIG. 5, that the partial duct 58 has an air nozzle 68 on the upper end, arranged in a telescoping height-adjustable manner within a depicted cut-out duct section 70 of the partial duct 58. In this way, the air nozzle 68, which is integrated in the headrest 60 and is not shown here, and the air outflow opening 62 are coupled in their movements with the vertically adjustable headrest 60. Consequently, the air outflow opening 62 is arranged optimally in relation to the height of the head and neck area when the headrest 60 has been adjusted to the seat occupant.

FIG. 8 shows, in an enlarged diagrammatic view of detail VIII in FIG. 5, the distribution system 64 of the duct configuration 22. The two partial ducts 31, 32 that run transversely to the partial duct 58 branch away from it. The distribution system 64 is shown openly through a window 76, which is broken away for clarity. The partial duct 58 can be closed partially or completely with a shut-off device 72 in the flow direction after the branch. A guiding device 74 is arranged in the two partial ducts 31, 32, respectively, in the area of the branch and/or in the flow direction in front of the shut-off device 72 in the form of a deflector plate. An overflow from the partial duct 58 into the two partial ducts 31, 32 can be avoided with at least a nearly completely open shut-off device 72. However, if the shut-off device 72 is completely or partially closed, so that pressure builds up in the area of the branch, then the air current coming from the lower area of the partial duct passes the respective guiding devices 74 and flows into the two partial ducts 31, 32 in a divided manner. The deflector plates protrude into the partial duct 58 over an angle α of preferably about 40–80° relative to the horizontal.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

We claim:

1. An automobile seat for a convertible motor vehicle comprising:
   a seat cushion,
   a back of the seat, and
   a headrest adjustably arranged on the back of the seat,
   wherein at least one air outflow opening of an air supply system, adapted to reduce undesirable drafts, is coupled for movement with adjustment of the headrest, and
   wherein at least one additional air outflow opening of the air supply system provided in a seat surface is adapted to face a seat occupant for seat ventilation purposes, seat heating purposes, or both seat ventilation and seat heating purposes.

2. The automobile seat according to claim 1, wherein the air supply system is arranged within the seat.

3. The automobile seat according to claim 1, wherein the air supply system has at least one fan integrated in the seat.

4. The automobile seat according to claim 1, wherein the air supply system has at least one heating element in order to warm up air currents exiting the at least one air outflow opening so as to reduce drafts and air currents exiting the at least one additional air outflow opening in the seat surface.

5. The automobile seat according to claim 1, wherein the air supply system is of a duct configuration through which the at least one air outflow opening to reduce drafts and the at least one additional air outflow opening provided in the seat surface are supplied.

6. The automobile seat according to claim 5, wherein the duct configuration can be mounted from the rear of the back of the seat.

7. The automobile seat according to claim 5, wherein the duct configuration and a rear back molding of the seat are designed as a component sub-assembly that can be fastened to a frame.

8. The automobile seat according to claim 1, wherein the at least one additional air outflow opening is one of a plurality of air outflow openings, and wherein at least some of the air outflow openings are also provided in the seat surface facing the seat occupant.

9. The automobile seat according to claim 1, wherein an exiting air current is directed at a neck area of the seat occupant.

10. The automobile seat according to claim 1, wherein the seat surface is defined by a seat cover that contains a plurality of air outflow openings.

11. An automobile seat for a convertible motor vehicle comprising:
    a seat cushion,
    a back of the seat, and
    an appropriate headrest for the back of the seat,
    at least one air outflow opening of an air supply system being arranged in an upper area of the back in order to reduce undesirable drafts, and
    at least one additional air outflow opening of the air supply system provided in a seat surface adapted to face a seat occupant for seat ventilation purposes, seat heating purposes, or both seat ventilation and seat heating purposes,
    wherein the air supply system is of a duct configuration through which the at least one air outflow opening to reduce drafts and the at least one additional air outflow opening provided in the seat surface are supplied,
    wherein the duct configuration has a distribution system with a first duct and at least one second duct branching off the first duct and running transversely to the first duct,
    wherein the first duct can be closed in the air flow direction after a branching area of the second duct by a shut-off device, and
    wherein, in the branching area of the second duct, an appropriate guiding device is provided, an overflow of the air current from the first duct into the second duct being avoided with said guiding device at least when the shut-off device is nearly completely open.

12. The automobile seat according to claim 11, wherein the seat surface is defined by a seat cover that contains a plurality of air outflow openings.

13. The automobile seat according to claim 12, and further comprising a spacer fabric, which is arranged beneath the seat cover and by which air flowing out of the duct configuration is distributed to the air outflow openings in the seat surface, allocated to the air supply system.

14. An automobile seat for a convertible motor vehicle comprising:
    a seat cushion,
    a back of the seat, and
    an appropriate headrest for the back of the seat,
    at least one air outflow opening of an air supply system being arranged in an upper area of the back in order to reduce undesirable drafts, and
    at least one additional air outflow opening of the air supply system provided in a seat surface adapted to face a seat occupant for seat ventilation purposes, seat heating purposes, or both seat ventilation and seat heating purposes,
    wherein the headrest is arranged in a vertically adjustable manner on the back of the seat, and
    wherein an air nozzle that contains the at least one air outflow opening for the purpose of reducing drafts is coupled in its movements with vertical adjustment of the headrest.

* * * * *